Jan. 8, 1952 M. L. THOMPSON 2,581,983

LINE-CORD ANTENNA

Filed May 1, 1947

INVENTOR.
MILTON L. THOMPSON
BY
Brown, Denk & Synnestvedt
AGENTS

Patented Jan. 8, 1952 2,581,983

UNITED STATES PATENT OFFICE 2,581,983

LINE-CORD ANTENNA

Milton L. Thompson, Huntingdon Valley, Pa., assignor to Philco Corporation, Philadelphia, Pa., a corporation of Pennsylvania Application May 1, 1947, Serial No. 745,325

6 Claims. (Cl. 250—20)

The invention herein described and claimed relates to radio receivers operable from A.-C. and/or D.-C. power lines, and more particularly to improved antenna systems therefor.

The antenna systems of the instant invention are particularly well adapted for use in combination with frequency-modulation receivers operating in the present 88 to 108 megacycle band. But the invention may also be employed to advantage at high frequencies outside this particular band, for example in the adjacent television channels and in the 42 to 50 megacycle frequency-modulation band.

Stated briefly, the present invention provides an improved circuit arrangement by means of which the line cord of a radio receiver may be utilized as an antenna in the reception of waves of relatively high carrier frequency. Broadly, of course, it is not new to provide means for utilizing the line cord as an antenna. For example, one prior line-cord antenna, which is typical of those known and used heretofore, is disclosed in British Patent No. 340,389, which issued on January 1, 1931. The present invention, however, provides an improved arrangement yielding superior results at very high carrier frequencies, combined with far greater structural simplicity and substantially reduced manufacturing costs.

It is, accordingly, a principal object of the present invention to provide an improved circuit arrangement by means of which the line cord of an A.-C. or D.-D. operated radio receiver may be utilized, effectively and economically, as an antenna in the reception of carrier waves of relatively high frequency.

It is a further object of the invention to provide an improved line cord antenna system whose effectiveness may be confined largely to a predetermined, desired frequency range.

To the foregoing general ends it is a feature of the present invention to provide, in a line-operated radio receiver, a novel line-cord antenna system comprising, in combination, a line cord adapted to connect the power supply circuits of said receiver with a source of electric power, means having low impedance at carrier-wave frequencies for connecting the receiver-end of the line cord to the chassis of said receiver, and means for coupling the antenna circuit of said radio receiver to the line cord at a point physically displaced, along said line cord, from the receiver-end thereof.

In accordance with a more specific feature of the invention, the antenna circuit of the radio receiver is coupled to the line cord at a point thereon having an R.-F. impedance to chassis which substantially matches the input impedance of the receiver's antenna circuit.

These and other objects and features of the invention, and the manner in which they are attained, will appear from the following detailed description and the accompanying drawings in which.

Figures 1, 2, 3:
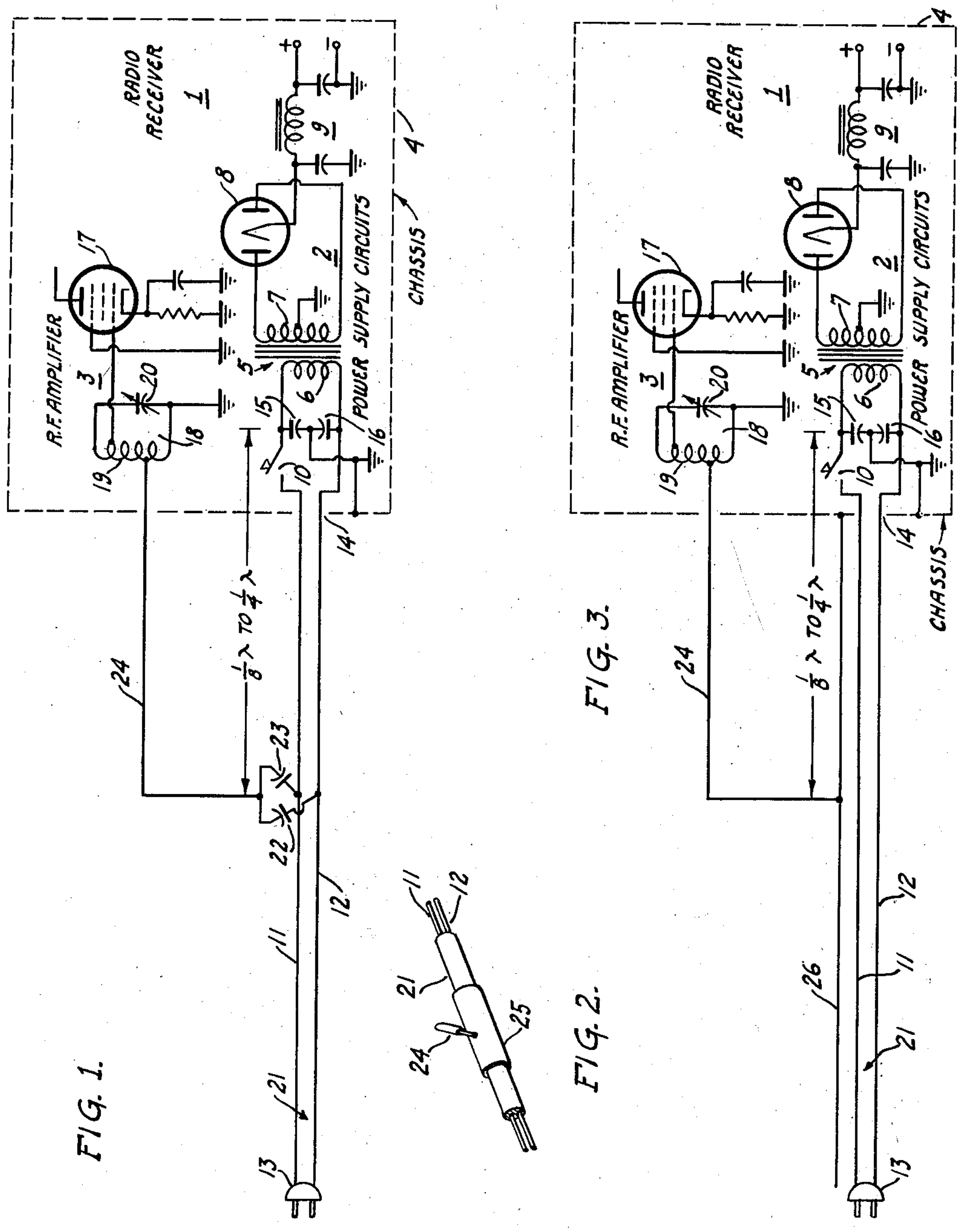
Fig. 1 is a schematic diagram of one embodiment of the invention.
Fig. 2 is a fragmentary illustration, in perspective, showing one physical embodiment of a portion of the apparatus shown schematically in Fig. 1.
Fig. 3 is a schematic diagram of an alternative embodiment of the invention.

Reference may now be had to Fig. 1 in which there is shown a radio receiver 1, illustrated only in fragmentary detail, and including, inter alia, a conventional power-supply circuit arrangement 2, a radio frequency amplifier stage 3, and a connecting metal chassis 4 of conventional structure and design upon which the various receiver components may be mounted.

The power-supply circuits 2 may include a power transformer 5 having a primary winding 6 and a secondary winding 7, the mid-point of which is connected to the chassis. The extremities of winding 7 are connected to the anodes of the full-wave rectifier tube 8. The high voltage output of the power-supply system is derived from the cathode of tube 8 by way of the usual filter network 9.

The primary winding 6 of transformer 5 is connected by way of the on-off switch 10 and conductors 11—12 to a connector plug 13 through the agency of which the receiver may be plugged in to any standard electric power outlet. Conventionally the conductors 11 and 12, commonly referred to collectively as the line cord, pass through a suitable aperture 14 in the chassis 4 for connection to the transformer primary 6. It is also customary to provide a pair of radio-frequency bypass capacitors 15 and 16 connected between the chassis 4 and the receiver-end of the line-cord conductors 11—12. These capacitors serve a dual purpose. First they prevent the appearance of high radio-frequency voltages between the receiver-end of the line cord and the chassis, as well as between the line conductors themselves, and thus they ensure against the inadvertent introduction of spurious noise and signal voltages into the receiver by way of the line cord and the power supply circuits. This is the conventional function of these capacitors. Secondly, and in accordance with the present invention, capacitors 15—16 provide a low-impedance radio-frequency connection between a predetermined point on the line cord and the chassis so that, as will be explained in detail hereinafter, desired high-frequency signal-voltages may be developed between said predetermined point and another predetermined point on said line cord.

Although, for purposes of illustration, an A.-C. type of power supply has been described, it is to be understood that the present invention is not limited to any specific form of power supply, and that D.-C. and A.-C./D.-C. supply circuits are equally applicable thereto.

Radio-frequency amplifier 3 is also conventional and may include, for example, a pentode 17 provided with a tuned antenna circuit 18 comprising a winding 19 and a variable capacitor 20. Variable capacitor 20 will ordinarily be ganged mechanically with other tuning elements (not shown) of the receiver.

As thus far described the radio receiver of Fig. 1 is entirely conventional, and accordingly it is deemed unnecessary to describe its construction and operation in further detail.

In accordance with the present invention an improved and novel arrangement is provided by means of which the line cord of a radio receiver may be utilized as an antenna in the reception of high-frequency carrier waves. With particular reference to Fig. 1 of the drawing, means are provided through the agency of which the line cord 21, comprising individual line-cord conductors 11 and 12, may be employed as an antenna, the wave signals received thereby being applied to the input circuit 18 of the R.-F. amplifier 3 by way of the coupling capacitors 22—23 and the conductor 24.

I have discovered that if the receiver-end of the line cord is provided with a suitable R.-F. connection to the chassis, rather strong high-frequency signal voltages are developed, with respect to the chassis, at points (or, perhaps more accurately, regions) spaced along the line cord. The high-voltage point or region nearest the chassis is physically spaced from the chassis a distance which is of the order of a quarter wavelength. Other regions of high signal voltage appear on the line cord at regions separated from the first-mentioned region by distances corresponding to integral multiples of a half wavelength. In general the distance from the chassis to the high signal-voltage point on the line cord is measured, along the line cord, from a point beginning at the effective R.-F. ground, rather than from the point on the line cord where it passes through the aperture 14 to the interior of the chassis. In the embodiment of Fig. 1, the effective R.-F. ground on the line cord 21 is, as indicated in the drawing, the point inside the chassis structure 4 at which the R.-F. bypass capacitors 15—16 are applied.

The signal voltage available at any given point on the line may be derived therefrom, and applied to the R.-F. input of the radio receiver, through the agency of a suitable R.-F. coupling means. In the arrangement of Fig. 1 the R.-F. voltage available at a point on the line cord approximately one-eighth to one-quarter wavelength removed from the chassis 4 is applied to the antenna circuit 18 of R.-F. amplifier 3 by way of the coupling capacitors 22—23 and the conductor 24. In practice it has been found sufficient to use only a single coupling capacitor, the distributed capacity between the line conductors 11—12 being such that, at the high frequencies at which the invention is applicable, the line conductors constitute effectively a single R.-F. conductor. Similarly it is not necessary that both line conductors be individually bypassed to chassis and if desired one of the capacitors 15—16 may be omitted. In some instances the distributed capacity to chassis of the power supply circuits may be sufficiently high to make the presence of either of these capacitors unnecessary. The arrangement shown, however, is preferred.

The precise point at which the conductor 24 is coupled into the line cord 21 is not at all critical. While the highest R.-F. line voltage is believed to be present at approximately the quarter-wave point on the line, optimum results are usually achieved by tapping into the line cord at a point within the eighth and quarter-wave limits indicated in Fig. 1, and, indeed, it has been found that satisfactory voltages can usually be derived at points outside these limits. It appears, as a matter of fact, that the best overall results are obtained when the tap is located at a point on the line cord having an R.-F. impedance to chassis which substantially matches the input impedance to the tuned antenna circuit 18. In one experimental model this input impedance was of the order of 150 ohms, the tap point on the winding 19 being that normally employed for matching the impedance of a 150 ohm transmission line feed from a dipole antenna.

While the coupling capacitors 22—23 may be of such size as to have negligible impedance over the desired wave band, it has been found that somewhat improved performance is provided if a smaller coupling capacitance is used which series resonates the primary of the antenna input circuit.

The experimental model referred to above was adapted to operate in the frequency-modulation band extending from 88 to 108 mc., the conductor 24 being tapped into the line cord 21 at a point 12 inches removed from the chassis aperture 14; in this instance the effective R.-F. line-cord ground point was about 4 inches inside the chassis (measured from the aperture 14), making a total of 16 inches between the tapped point and the R.-F. ground. This is equivalent to a distance of somewhat more than an eighth wavelength at 100 mc. The total coupling capacity employed at the tap point was about 12 $\mu\mu$f. The position of the tapped point was found to be not critical within plus-or-minus 3 inches.

Experience has shown that the physical disposition, or lead dress, of the conductor 24 is not at all critical. Signal pickup is reduced somewhat, however, if the conductor 24 is laid closely along the line conductors 11—12 and the chassis 4 throughout its length. If the conductor 24 and the line cord 21 are introduced into the chassis through spaced apertures, as indicated in the drawing, it will suffice simply to permit the leads to fall where they may.

Where the required coupling capacitance, as represented in Fig. 1 by capacitors 22—23, is small, as in the foregoing illustration, a considerable mechanical simplification may be effected by capacitively coupling the conductor 24 to the line conductors 11—12 by means of the arrangement illustrated in Fig. 2. In that figure there is illustrated, in perspective, a fragmentary section of line cord 21 comprising a pair of individual, insulated conductors 11 and 12. A conducting metal sleeve 25 is fitted snugly onto the line cord at the appropriate point, as hereinbefore explained, and to this sleeve the conductor 24 is soldered, clamped, or otherwise secured. The length of the sleeve may be so chosen as to provide the requisite coupling capacity between the conductor 24 and the line conductors 11—12. In the physical embodiment of the invention already referred to the length of sleeve 25 necessary to provide the desired capacitance (12 $\mu\mu$f.) was approximately 2 inches.

Laboratory experiments and field tests have established that, in the operation of radio receivers embodying the present invention, the major portion of the received signal is contribuated by the line cord itself, and not by the house wiring system into which the line cord is plugged. These experiments also show that the conductors 11—12 function, at high carrier frequencies, as a unitary signal-collecting conductor. In general, it was found that the line-cord antenna of the present invention provides better signal pickup than is provided by the small, bent type of dipole antenna frequently affixed to the rear surface of the cabinet housing the radio receiver.

An alternative embodiment of the invention is illustrated in Fig. 3. In the arrangement there shown a third conductor 26 parallels the two line conductors 11—12. Physically the three conductors 11, 12, and 26 may comprise a single, insulated, triple-conductor cable, the two line-cord conductors 11—12 terminating in the usual manner in the plug 13. The third conductor 26 may be terminated, at its left-hand end, just short of the plug 13, and at its right-hand end may be soldered or otherwise secured to the chassis 4 in such manner as to provide an R.-F. ground connection. In this arrangement the conductor 24 may be tapped directly to the selected point on the conductor 26, the coupling capacitances previously described being omitted if desired. Physically, the third conductor 26 may be regarded as an alternative means for coupling the radio frequency input circuit 18 to the line-cord conductors 11—12 to a predetermined intermediate point on said line cord. Tests have shown that the embodiments of Figs. 1 and 3 give substantially identical results. These tests showed further that the third conductor need not be connected to the chassis and that, in fact, the conducor 26 may be shorter at either end, or at both ends, than the line conductor itself.

Although the invention has been described with particular reference to certain illustrated embodiments, it will be apparent that the invention is capable of still other forms of physical expression, and is limited only by the scope of the appended claims.

I claim:

1. In a line-operated receiver of waves of very high carrier frequencies, a line-cord antenna system comprising: a conducting chassis upon which components of said receiver are mounted; a line cord adapted to connect the power supply circuits of said receiver with an external source of electric power, both conductors of said line cord, at the receiver-end thereof, being connected to said power supply circuits through conductive connections which are free of concentrated inductance; connections, including capacitive means, providing a low impedance path at said carrier frequencies between both conductors of said line cord, at the receiver-end thereof, and said chassis; a radio-frequency input circuit for said receiver, said input circuit having two input terminals, one of said terminals being connected to said chassis; and means for coupling the other of said input terminals to both conductors of said line cord at a point physically displaced, along said line cord, from the receiver-end thereof a distance sufficient to provide, between said point and said chassis, a substantial radio-frequency impedance at said carrier frequencies, across which impedance carrier-frequency voltages of substantial magnitude are developed in response to electromagnetic waves of said frequencies.

2. The combination claimed in claim 1, characterized in that said coupling point is displaced from the said receiver end of said line cord by a distance which, at said carrier frequencies, is of the order of one-eighth to one-quarter wavelength.

3. The combination claimed in claim 1, characterized in that the said other radio-frequency input terminal is coupled to said line cord at a point having a radio-frequency impedance with respect to said chassis which approximately matches the input impedance of said radio-frequency input circuit.

4. In a line-operated radio receiver, a line-cord antenna system adapted to operate in the frequency range extending from approximately 88 to 108 megacycles, said antenna system comprising: a metal chassis upon which components of said receiver are mounted; a line cord adapted to connect the power supply circuits of said receiver with an external source of electric power, both conductors of said line cord, at the receiver-end thereof, being connected to said power supply circuits through conductive connections which are free of concentrated inductance; connections, including capacitive means, providing a low impedance path within said frequency range between both conductors of said line cord, at the receiver-end thereof, and said metal chassis; a radio-frequency input circuit for said radio receiver, said input circuit having two input terminals, one of said terminals being connected to said chassis; and means for coupling the other of said input terminals to both conductors of said line cord at a point displaced, along said line cord, a distance of the order of 13 to 19 inches from the bypassed end thereof.

5. The combination claimed in claim 4, characterized in that said coupling means includes a coupling capacitance having a capacity of the order of a few micromicrofarads.

6. In a line-operated receiver of waves of very high carrier frequencies, a line-cord antenna system comprising: a conducting chassis upon which components of said receiver are mounted; a line cord adapted to connect the power supply circuits of said receiver with an external source of electric power, the conductors of said line cord, at the receiver end thereof, being connected to the input terminals of said power supply circuits; connections, including capacitive means, providing a low impedance path at said carrier frequencies between both conductors of said line cord, at the receiver end thereof, and said chassis; a radio-frequency input circuit for said receiver, said input circuit having two terminals, one of said terminals being connected to said chassis; and means for connecting the other of said terminals to both conductors of said line cord at a point physically displaced, along said line cord, from the said receiving end thereof a distance sufficient to provide, between said point and said chassis, a substantial radio-frequency impedance at said very high carrier frequencies, across which impedance carrier frequency voltages of substantial magnitude are developed in response to electromagnetic waves of said frequencies.

MILTON L. THOMPSON.

REFERENCES CITED

The following references are of record in the file of this patent:

UNITED STATES PATENTS

| Number | Name | Date |
|---|---|---|
| 1,744,091 | Wrape | Jan. 21, 1930 |
| 1,745,096 | Jayne | Jan. 28, 1930 |
| 1,772,776 | Ludwig | Aug. 12, 1930 |
| 1,970,986 | Tamol | Aug. 21, 1934 |
| 2,268,812 | Foster | Jan. 6, 1942 |
| 2,310,896 | Gustafson | Feb. 9, 1943 |

FOREIGN PATENTS

| Number | Country | Date |
|---|---|---|
| 340,389 | Great Britain | Jan. 1, 1931 |
| 591,496 | France | July 4, 1925 |